(12) United States Patent
Clark (10) Patent No.: US 6,521,067 B1
(45) Date of Patent: Feb. 18, 2003

(54) ULTRASONIC SEAM BONDING METHOD AND APPARATUS

(75) Inventor: Robert Clark, Midlothian (GB)

(73) Assignee: Rosslyn Precision Limited, Midlothian (GB)

( * ) Notice: Subject to any disclaimer, the term of this patent is extended or adjusted under 35 U.S.C. 154(b) by 0 days.

(21) Appl. No.: 09/623,956

(22) PCT Filed: Mar. 12, 1999

(86) PCT No.: PCT/GB99/00758

§ 371 (c)(1),
(2), (4) Date: Jun. 11, 2001

(87) PCT Pub. No.: WO99/46110

PCT Pub. Date: Sep. 16, 1999

(30) Foreign Application Priority Data

Mar. 12, 1998 (GB) .............................. 9805176

(51) Int. Cl.[7] .............................. B32B 31/16
(52) U.S. Cl. .................. 156/73.1; 156/290; 428/58
(58) Field of Search ............... 156/73.1, 73.4, 156/157, 290, 304.1, 304.6, 580.1, 580.2; 428/57, 58

(56) References Cited

U.S. PATENT DOCUMENTS 3,464,102 A * 9/1969 Soloff ..................... 29/200
3,526,554 A * 9/1970 Obeda .................... 156/73.1
3,642,010 A * 2/1972 Kuris ........................ 132/5
3,727,619 A * 4/1973 Kuris ....................... 132/56
5,746,981 A * 5/1998 Satoh ...................... 422/128

FOREIGN PATENT DOCUMENTS

| CA | 2056812 | * | 3/1993 |
| DE | 41 03 740 A1 | * | 8/1992 |
| EP | 0 032 703 A1 | * | 7/1981 |
| GB | 2 301 296 A | * | 12/1996 |
| WO | WO 96/38256 | * | 5/1996 |
| WO | WO 97/23726 | * | 7/1997 |

* cited by examiner

Primary Examiner—James Sells
(74) Attorney, Agent, or Firm—Clifford W. Browning; Woodard, Emhardt, Naughton, Moriarty & McNett LLP (57) ABSTRACT

This invention relates to an apparatus and method for joining fabric, particularly for joining separate pieces of layered fabric, by means of waterproof seam in a single operation. The seam bonding apparatus comprises a hot-melt adhesive supply (20), a transducer (24) which supplies ultrasonic energy and a sonotrode (23) which directs the ultrasonic energy to an application point on the seam to be bonded. Adhesive, preferably molten nylon, is fed through a passage (25) in the sonotrode (23) via an exit aperture (28) at the end of the sonotrode to the application point. Local heat is applied to the other side of the seam at the application point, and the seam is then subjected to local cooling to form a permanent waterproof seam.

26 Claims, 6 Drawing Sheets

ULTRASONIC SEAM BONDING METHOD AND APPARATUS

This invention relates to an apparatus and method for joining fabric, particularly for joining separate pieces of layered fabric, by means of a waterproof seam in a single operation.

The apparatus and method of the invention allows separate pieces of fabric (woven, non-woven or laminated) to be joined with a strong, flexible, waterproof seam in a single operation.

Presently, many fabrics are sewn together with thread. If waterproofing of the seams is required, this is achieved by applying a sealing tape. This is a non-porous adhesive tape which covers the seam completely, and prevents moisture from passing through the gap between the fabric pieces, through the needle holes or along the threads. Making such a seam is a two-stage process, with the seam first being sewn, and then later being waterproofed with sealing tape. Such a process is time consuming and costly.

An alternative method of joining thin sheets of thermoplastic is by welding the sheets together. Such welds are formed by overlapping the sheets of material and then fusing them by heating. This is done by using heated rollers or knives, or by ultrasonic action, as is disclosed by Canadian Patent Application No. 2,056,812.

Adhesives may be used to join overlapping sheets of material to form a seam, but the practice is uncommon, due to problems in reliability, surface preparation, and achieving uniform adhesive spread.

Overlapping welded or glued bonds are problematic for laminated fabrics. When the seam is flexed, any loads are transferred through the adjacent outer laminations of each piece of fabric (see FIG. 1). This results in an uneven stress distribution over the cross-section of the fabric, which leads eventually to de-lamination. IN the case of laminated fabrics, better stress transfer would be obtained by joining the fabric pieces end-to-end, with adhesive, so that loads could be transferred evenly across the bond in contrast to the prior art. For example, Canadian Patent Application No 2,056,812 discloses a method of joining sheets of a non-woven fabric in an overlapping or face to face configuration (see FIGS. 2 and 3 therein and page 2, lines 12–17 therein) applying a hot-melt adhesive through a glue nozzle, passing the sheets over a patterned anvil roll and heating the joint by means of an ultrasonic horn which transmits mechanical vibrations to the sheets to be joined. This method does not function well with fabrics other than very light, thin non-woven fabrics.

It is an object of the present invention to provide an apparatus and method for joining fabric in a single operation, which is suitable for use with laminated fabrics, which promotes penetration of the fabric by the adhesive, and which allows a strong bond to be made.

According to a first aspect of the invention there is provided a seam bonding apparatus comprising a hot-melt adhesive supply means, an ultrasonic energy source and a sonotrode adapted to direct ultrasonic energy to an application point on the seam to be bonded, wherein the sonotrode has therein a passage adapted to permit flow therethrough of adhesive from said hot-melt adhesive supply means to said application point.

Preferably the apparatus further comprises a nozzle communicating with said passage. Preferably said nozzle is adapted to be less than 5 mm from the application point, most preferably less than 2 mm from the application point.

According to a particular embodiment said nozzle is integral with said sonotrode. Preferably said passage comprises a first axial portion. Preferably said passage further comprises a substantially radial portion communicating with said axial portion.

According to a further particular embodiment the apparatus comprises a glue chamber adjacent to said sonotrode. Preferably said passage and said nozzle each communicate with said glue chamber. Preferably said glue chamber has a parabolically shaped inner surface.

Preferably said hot-melt adhesive supply means comprises a hot-melt adhesive tank and a pump. Preferably the apparatus further comprises a heated delivery pump connecting said pump to the passage.

According to a second aspect of the invention there is provided a method for producing a bond between members of an article, said method comprising the steps of:

heating a hot-melt adhesive until it is molten, feeding said molten adhesive to an application point in which said adhesive contacts said members, applying ultrasound energy by means of a sonotrode to said molten adhesive, and allowing said molten adhesive to cool and thereby form a bond between said members.

Preferably mechanical vibrations are induced by the ultrasound energy in said members to aid the formation of the bond.

Preferably the molten adhesive is fed through a passage in said sonotrode.

Preferably the molten adhesive is fed onto the application point through a nozzle positioned such that there is a small gap between said members and said nozzle. Preferably said gap is less than 5 mm, most preferably less than 2 mm.

Preferably said members are positioned in an abutting position, such that a butt bond is produced between said members.

Preferably the method uses an apparatus according to the first aspect of the invention.

According to a third aspect of the invention there is provided an article comprising a plurality of members and having a bond produced between two of said members by the method according to the second aspect of the invention.

The method and apparatus of the invention offer significant advantages over the prior art. The method poses little threat to the operator, and the following effects of using ultrasound aid the formation of a good bond:

a. Energy can be transmitted via the molten adhesive to the seam. This energy can also be focused.

b. Ultrasound causes heating and softening of solid polymer, such as the fabric fibres in contact with the adhesive. Crystallisation of the molten adhesive is also inhibited.

c. Ultrasound can cause cavitation in liquids. There are two manifestations:

i. Cyclical expansion and contraction of stationary voids. This causes pumping of the surrounding liquid, to form microstreams.

ii. Random formation of large voids which subsequently implode, causing high pressure transients.

These effects encourage separation of the fabric fibres and active infiltration by the adhesive.

The fabric may be preheated to achieve a good bond with the holt-melt adhesive.

The process is particularly effective when used with composite fabrics having between two and four layers with a total thickness of 200–500 $\mu$m. With such fabrics the method can achieve seam sealing rates in the range 2–8 m/min (0.033–0.33 m/s).

Seam sealing according to the invention can be carried out with composite fabrics whose outer layers are commonly polyester, nylon, acrylic or polyester-cotton. The composite fabrics may include semi-permeable membranes of polyamide or polyurethane.

It is possible to extrude the adhesive into a thread, allowing it to be fed to the seam as a solid. Different diameters of thread may be matched with different thicknesses of material, to be transported by the same feed mechanism as the fabric.

Cooling may be by forced convection, using the cold air-stream from a vortex tube. The hot air by-product of the tube may be used for preheating the fabric.

Peltier heat pump assemblies are available, rated at tens of Watts. These may be attached to compression plates, recessed to avoid contact with the adhesive, which remove heat from the fabric by conduction, and from the melt by radiation and conduction via the fabric.

An embodiment of the invention will now be described, by way of example only, with reference to the accompanying figures, where.

Figure 1:
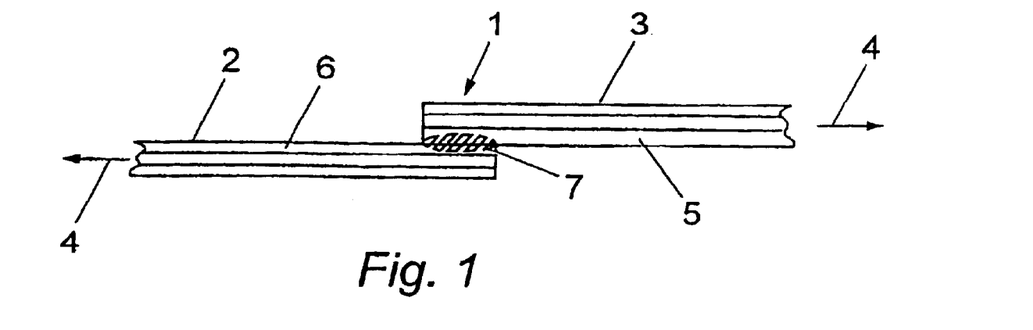
FIG. 1 is a section through a prior art laminated fabric seam.

Referring to FIG. 1 there is shown a seam 1 formed by applying adhesive 7 between two laminated fabric sheets 2 and 3. When the joined sheets are subject to tension in the direction of arrow 4, then there is a tendency for laminations 5 and 6 to separate from the other lamination.

Figure 2:
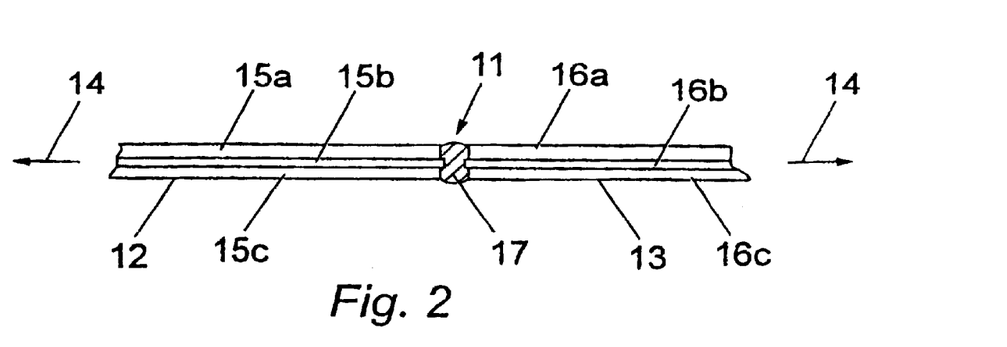
FIG. 2 is a section through a laminated fabric seam obtained by the apparatus and method of the invention.

Referring to FIG. 2 there is shown a seam 11 between two laminated fabric sheets 12 and 13. Adhesive 17 is applied between the two sheets 13 such that each lamination 15a, 15b, 15c of sheet 12 is bonded to a respective lamination 16a, 16b, 16c of sheet 13. When the joined sheets are subject to tension in the direction of arrow 14, then there is no tendency for one lamination to separate from the other laminations in the sheet.

Figure 3:
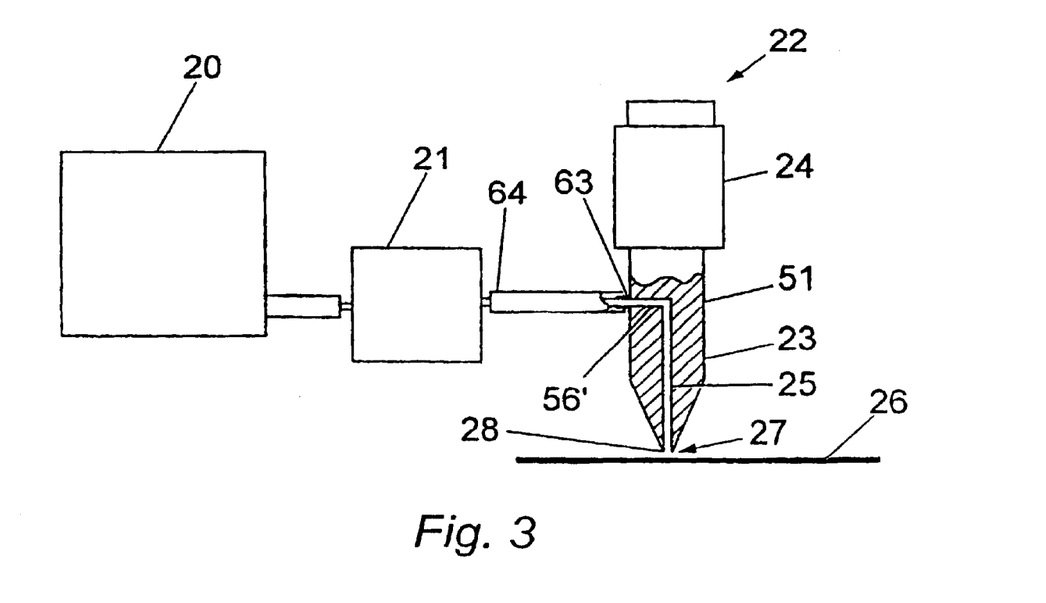
FIG. 3 is a schematic view of the apparatus according to a first embodiment of the invention.

Referring to FIG. 3, adhesive, in a molten state, is stored in a tank 20. When required, the adhesive is pumped to the delivery apparatus 22 at an electronically controlled rate by a polymer pump 21 or similar pump. The delivery apparatus 22 consists of a hollow sonotrode 23 attached to an ultrasonic transducer 24. The adhesive is further heated by the ultrasound as it passes through a passage 25 in the sonotrode, which is separated from the fabric 26 by a small gap 27. This gap 27 is bridged by the adhesive when a bead of adhesive (not shown) is formed at the nozzle 28, so that the seam in the fabric 26 is coupled by the adhesive to the sonotrode 23. Ultrasound energy is thus transferred to the material of the fabric 26 as well as to the adhesive, so that there is local heating and/or melting of the fabric 26 at the seam. This improves the bond between the fabric 26 and the adhesive.

Figure 4:
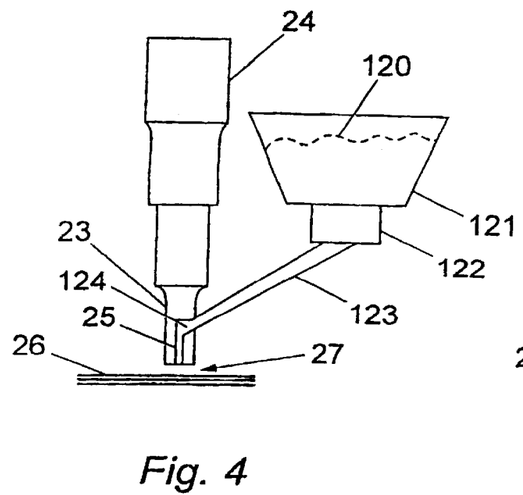
FIG. 4 is a schematic view of the apparatus according to a second embodiment of the invention.

Referring to FIG. 4, there is shown an alternative method of feeding adhesive to the sonotrode 23. Granules 120 of hot melt adhesive in the solid state (for example stock nylon granules) are placed in a feed hopper 121. A feed screw 122 feeds the granules along the feed tube 123 to a small internal reservoir 124 within the sonotrode 23. The granules are heated within the reservoir 124 and are then fed through the passage 25 to the fabric 26, in the same manner as described with reference to FIG. 3.

Figure 5:
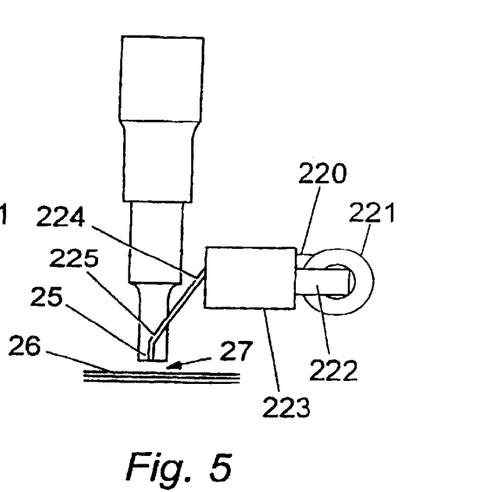
FIG. 5 is a schematic view of the apparatus according to a third embodiment of the invention.

Referring to FIG. 5, there is shown a further alternative method of feeding adhesive to the sonotrode 23. Nylon in thread form 220 is supplied on a bobbin 221 which is mounted on a support 222 so that it can rotate freely. An electrically controlled push-pull feed motor 223 feeds the thread along a pipe 224 to a small internal passage 225 within the sonotrode 23. The thread is heated within the passage 225 and is then fed through the exit passage 25 to the fabric 26, in the same manner as described with reference to FIG. 3.

Figure 6:
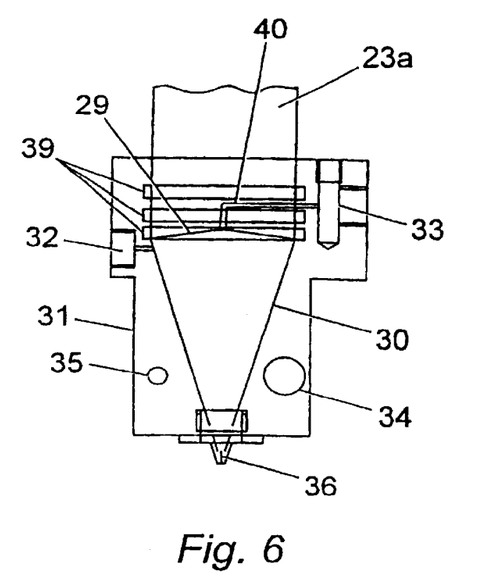
FIGS. 6 to 8 are sections through three alternative embodiments of the apparatus shown in FIG. 3, showing different sonotrode arrangements.

FIG. 6 shows a detail of a sonotrode 23a having a reservoir 30 formed as a conical bore within a base 31 attached to the lower end of the sonotrode 23a. The lower face 29 of the sonotrode 23a is conical. Glue is introduced into the reservoir 30 through the entrance 32 by means of a pump (not shown), and air is bled along a passage 40 from lower face 29 of the sonotrode out through the bleed hole 33 in the base 31 of the sonotrode. A supplementary heater 34 aids heating of the adhesive in the reservoir 30. A thermocouple 35 monitors the temperature in the reservoir 30. The glue is fed through nozzle 36. O-ring seals 39 allow relative vibration movement between the sonotrode 23a and the base 31. The inner surface of the reservoir 30 could be parabolic instead of conical, to focus the ultrasound to the lower end of the reservoir 30 and the outlet nozzle 36.

In the arrangement of FIG. 6 a proportion of the ultrasonic energy is absorbed by the glue inside the reservoir 30, and does not leave the nozzle 36 to excite the glue lying on the fabric 26.

Figure 7:
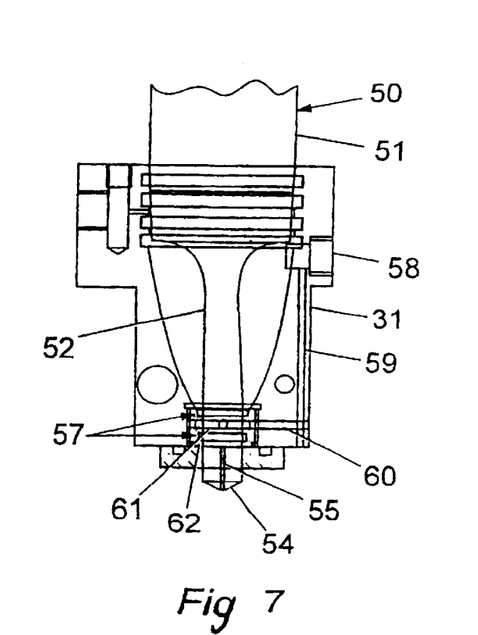

Referring to FIG. 7, there is shown a sonotrode arrangement which overcomes this problem. Ultrasound is transmitted down through the glue in the chamber, via the modified sonotrode 50, which is shown in more detail in FIG. 9. The modified sonotrode comprises a large diameter cylinder 51 at one end of which is a small diameter cylinder 52, connected to the large cylinder 51 by radiused chamfers 53. The end 54 of the small diameter cylinder has a conical shape which acts as an exit nozzle for the glue, and has an axial passage 55 bored therein, typically of 1 or 2 mm diameter and extending as far as a radial passage 56 of similar diameter with which it communicates.

The modified sonotrode 50, as shown in FIG. 7, has two o-rings 57 either side of the radial passage 56, which limit the glue to a band surrounding the narrow stem 52 of the sonotrode. Glue is fed via entrance 58 through passages 59 and 60 to a chamber 61 bounded by the sonotrode stem 52, the o-rings 57 and a cylindrical bore in the base 31. The cylindrical bore may have a sleeve lining 62.

It is possible to eliminate the o-rings, which tend to wear and fail in this arrangement. In this case the axial glue passage can extend further along the sonotrode, as shown in FIG. 3 to a radial passage 56' in the main body 51 of the sonotrode. A rigid connection 63 at the surface of the sonotrode connects the radial passage 56' to a heated glue supply pipe 64 which is flexible enough to accommodate the vibratory movement of the sonotrode with respect to the pump 21.

Figure 8:
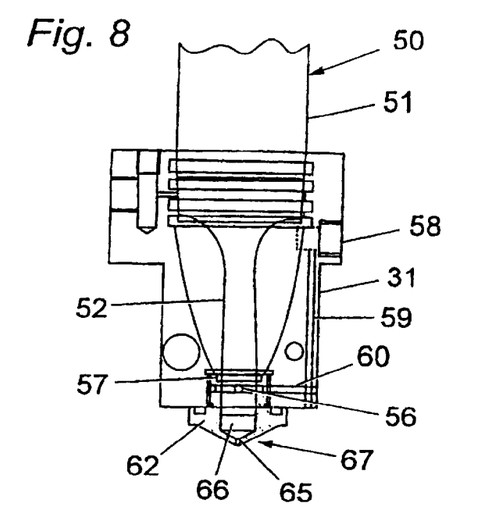

FIG. 8 shows an alternative nozzle arrangement to that of FIG. 7. The same reference signs are used to denote the same features as those in FIG. 7. The nozzle 67 of FIG. 8 incorporates an extended sleeve member 62 which covers the end of the sonotrode stem 52 and has an axial passage 65 through which the glue exits. There is a single o-ring 57 above the exit of the radial passage 56, so that the glue fills a small reservoir 66.

The arrangements of FIGS. 7 and 8 limit the dissipation of ultrasound by reducing the volume of glue in contact with the sonotrode. The glue is prevented from escaping upward from the radial passage 56 by the o-ring 57 between the nozzle interior and the sonotrode.

Figure 9:
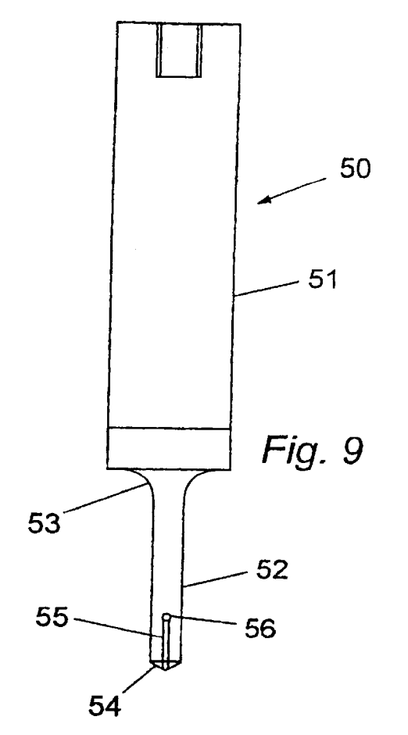
FIG. 9 is a side elevation of the sonotrode of the apparatus of FIG. 7.

FIG. 9 shows a side view of the sonotrode used in the nozzle of FIG. 8. The sonotrode is longer than strictly necessary, because it passes through the hot glue tank in the base 31. Typically the length is about 200 mm, the diameter of the upper portion 51 is about 30 to 40 mm and the diameter of the lower portion is about 7 to 10 mm. In the version shown schematically in FIG. 3 the tank is remote from the sonotrode and connected by a heated pipe. The frequency used with the sonotrode of FIG. 9 was 20 kHz, which is just audible. Preferably higher frequencies are used, typically 30 kHz or 40 kHz. This increased frequency reduces the wavelength of the ultrasound in the sonotrode, so a shorter length will be required.

Figure 10:
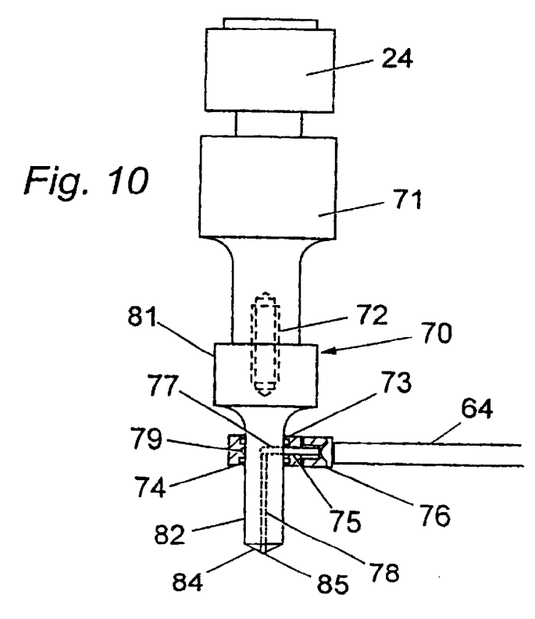
FIG. 10 is a section through a fourth alternative embodiment of the apparatus shown in FIG. 3.

Referring to FIG. 10, there is shown a sonotrode arrangement which utilises a booster to amplify the ultrasound energy at the point of application, and which has a simplified arrangement for connecting the adhesive supply hose to the sonotrode. Ultrasound is generated by the transducer 24 and amplified by the booster 71, whose cross-sectional area reduces in size away from the transducer. The booster is coupled by a threaded connection 72 to the sonotrode 70. The sonotrode comprises a large diameter cylinder 81, typically 30 mm diameter and 20 mm long, at one end of which is a small diameter cylinder 82, typically 12 mm diameter and 45 mm long, connected to the large cylinder 81 by radiused chamfers 83. The end 84 of the small diameter cylinder has a conical shape which acts as an exit nozzle for the glue, and has an axial passage 78 bored therein, typically of 1 mm diameter and extending as far as a radial passage 77 typically of 2 mm diameter with which it communicates.

The small diameter cylinder 82 of the sonotrode 70, as shown in FIG. 10, has a yoke 73 arranged about it at the nodal point of the sonotrode, and sealed to the sonotrode by two o-rings 74, typically of PTFE or other suitable heat resistant material. The yoke 73 may be of aluminium or brass or other suitable material. The O-rings 74 are positioned either side of a circumferential grooved passage 79 in the yoke; which communicates with the radial passage 77 in the sonotrode and an entrance bore 75 in the yoke. The seals 74 limit the glue to the grooved passage 79 surrounding the narrow stem 82 of the sonotrode. Glue is fed by means of heated hose 64 through connector 76 to the entrance bore 75 of the yoke 73, and then through the radial and axial passages 77, 78 in the sonotrode to the exit nozzle 85.

The apparatus may include handling and feed mechanisms (not shown), similar to those of a conventional sewing machine. The adhesive delivery/insonation device is held stationery while the pieces of fabric to be joined are passed below. Fabric handling and feed mechanisms may maintain a fixed gap between the pieces as they pass below the bonding equipment. The two pieces of fabric being joined are held stationary, relative to one another, until the adhesive has cooled enough for the seam to be mechanically stable. In one variation of the invention the machine incorporates a flat-bed for making sheets of bonded fabric; in another variation the machine has an arm, on which the adhesive supply nozzle is mounted, in order to produce tubes such as sleeves.

The cooling rate of the seam may be enhanced by using one or more refrigeration devices. These are important in rapidly cooling the joint after formation when the fabric is processed at high speed.

Various cooling methods are possible. Vortex tubes can produce a pressurised source of cold air, down to sub-zero temperatures. A by-product of their operation is a stream of hot air, which may be used for fabric pre-heating. Solid-state refrigerating devices known as thermo-electric devices may also be used. These use the Peltier effect and are capable of pumping from milliwatts to hundreds of watts of heat. The evaporation of water droplets sprayed into the hot seam allows an excellent cooling rate, but the adhesives tend to absorb water. Presently, a thermo-electric device is favoured as a cooling method.

To further aid adhesion, the fabric may be preheated, for example by using an infra-red heater.

It is possible to incorporate the apparatus of the invention in a hand-held device, which can be moved like a MIG welding apparatus to form a seam between pieces of fabric. This allows unrestricted movement in three dimensions.

It is possible to mount the apparatus of the invention on a robotic arm to allow automated seam-bonding on three dimensional objects. One application for such a system would be to bond the pieces of a shoe, held on a last.

Figures 11, 12:
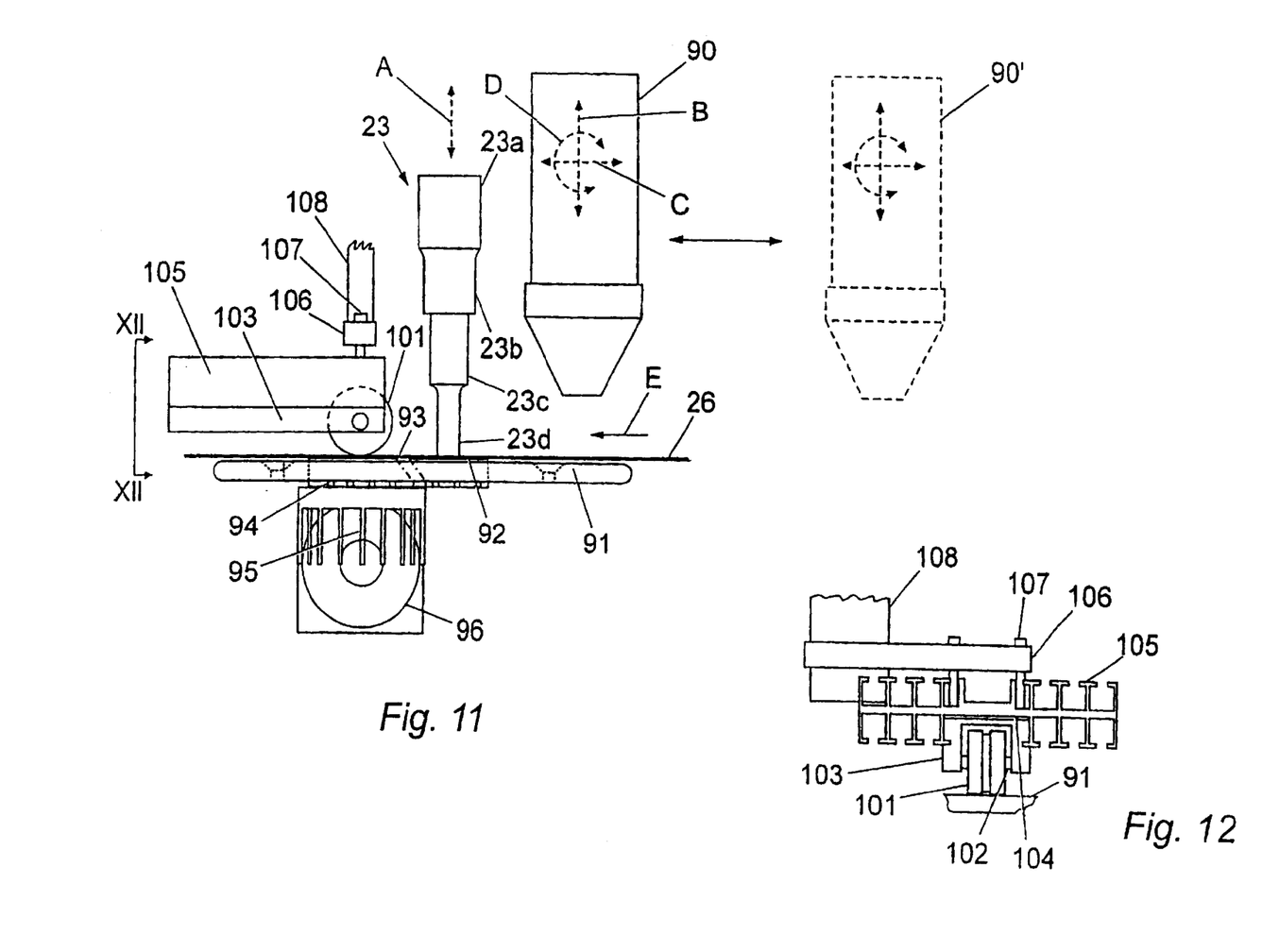
FIG. 11 is a side elevation on an apparatus according to a further embodiment of the invention, showing the heating and cooling means.
FIG. 12 is a front elevation on line XII—XII of FIG. 11.
Figure 13:
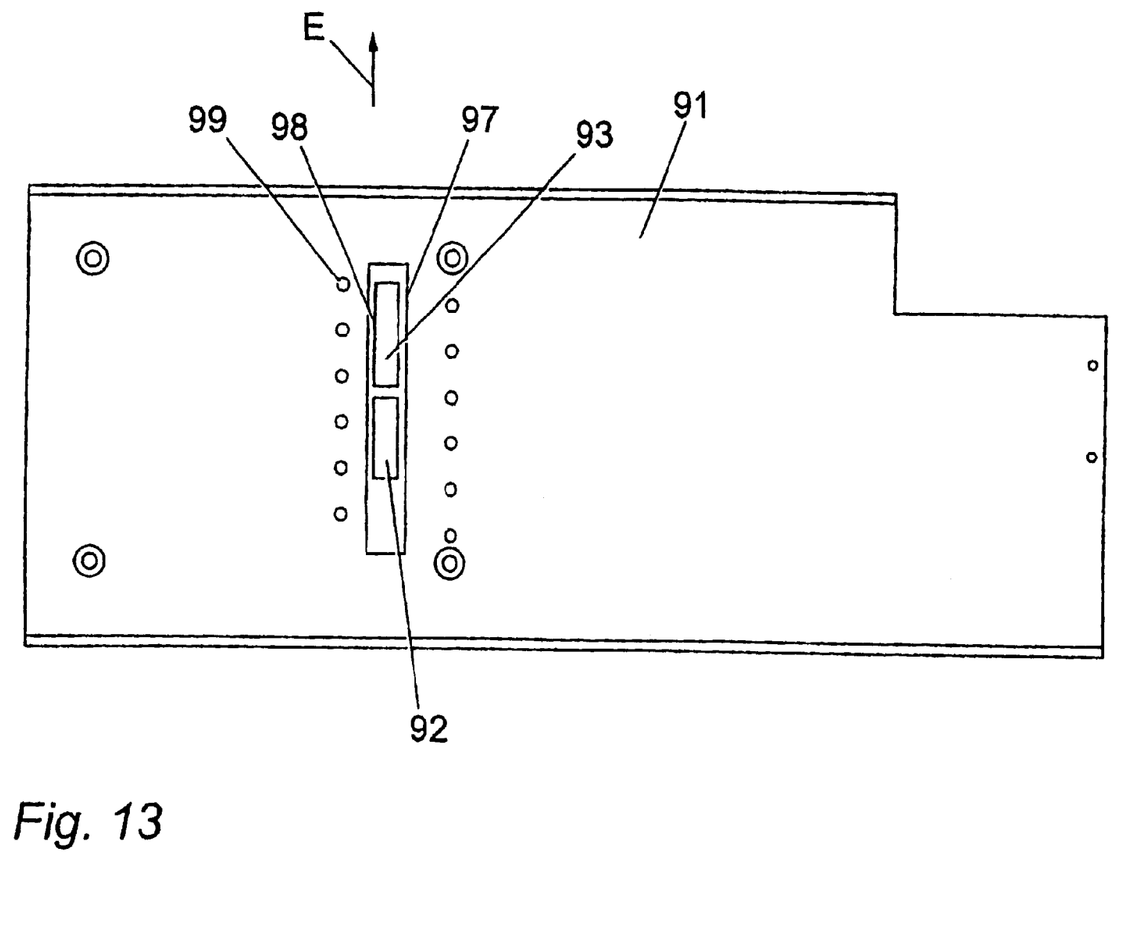
FIG. 13 is a plan view on the fabric support surface of the apparatus of FIG. 11.

One example of an apparatus according to the invention which also incorporates heating and cooling means is shown at FIGS. 11 to 13. A sonotrode 23 is mounted such that its height may be varied in the direction of Arrow A, to allow for the joining of fabrics of different thickness and to allow access to the nozzle. Hot melt adhesive is supplied through the sonotrode in a manner described above with reference to FIGS. 3 to 10. An infra red source 90 is mounted such that its position can be varied (for example to position 90') in the directions of arrows B, C and D to direct the infra red energy to the most appropriate point on the fabric support surface 91 so as to preheat the portions of fabric 26 as they move in the direction of the arrow E towards the sonotrode 23.

An electrically heated hot plate 92 directly beneath the sonotrode heats the fabric at the point of application of the adhesive, to ensure that the adhesive fully penetrates the fabric joint. Immediately behind the hot plate 92 is a cooled plate 93 connected to a bottom side cooling assembly comprising a Peltier device 94, a ribbed heat sing 95 and a fan 96. The hot plate 92 and cooled plate 93 project through a slot 97 in the fabric support surface 91. Between the slot 97 and the plates 92, 93 is provided insulation 98 in the form of polyetheretherketone (PEEK) or similar. The hot plate 92 and bottom side cooling assembly are secured to the fabric support surface 91 by countersunk bolts 99.

In addition there is provided a top side cooling assembly comprising a stainless steel roller 101, mounted on a bearing 102 adapted to maximise heat transfer between the roller 101 and the roller housing 103, a Peltier device 104 and a heat sink 105. The assembly is supported on an insulating support arm 106 by fasteners 107, and the support arm 106 is held by a main support 108 secured to the apparatus.

Typically the sonotrode comprises four cylindrical sections, each connected by a radiused chamfer. The upper section 23a is typically between 20 and 50 mm in diameter and between 20 and 40 mm in length. Subsequent sections 23b, 23c, 23d are between 5 and 10 mm smaller in diameter than the adjoining section above, and are of a similar length. Typically the lower section 23d, in which is provided the glue outlet passage 55, is between 6 and 15 mm in diameter.

Figure 14:
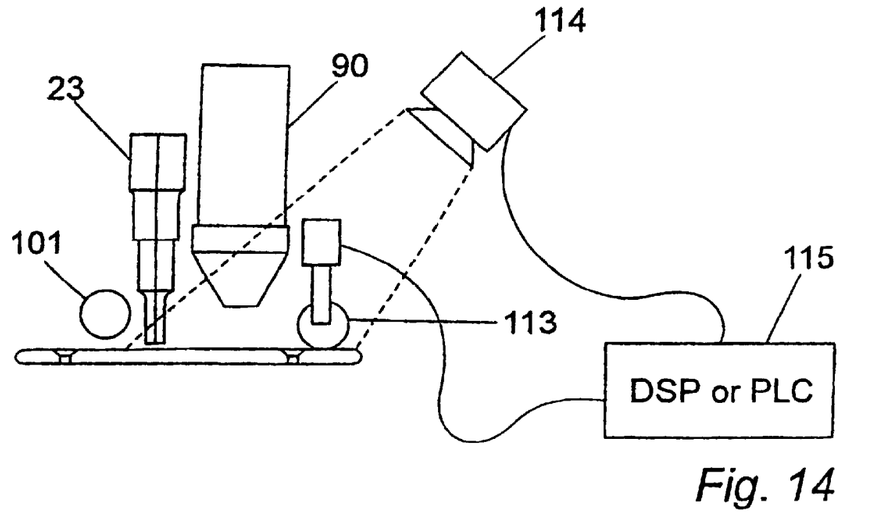
FIG. 14 is a schematic view of the apparatus of FIG. 11 incorporating a video gap detection system.
Figure 15:
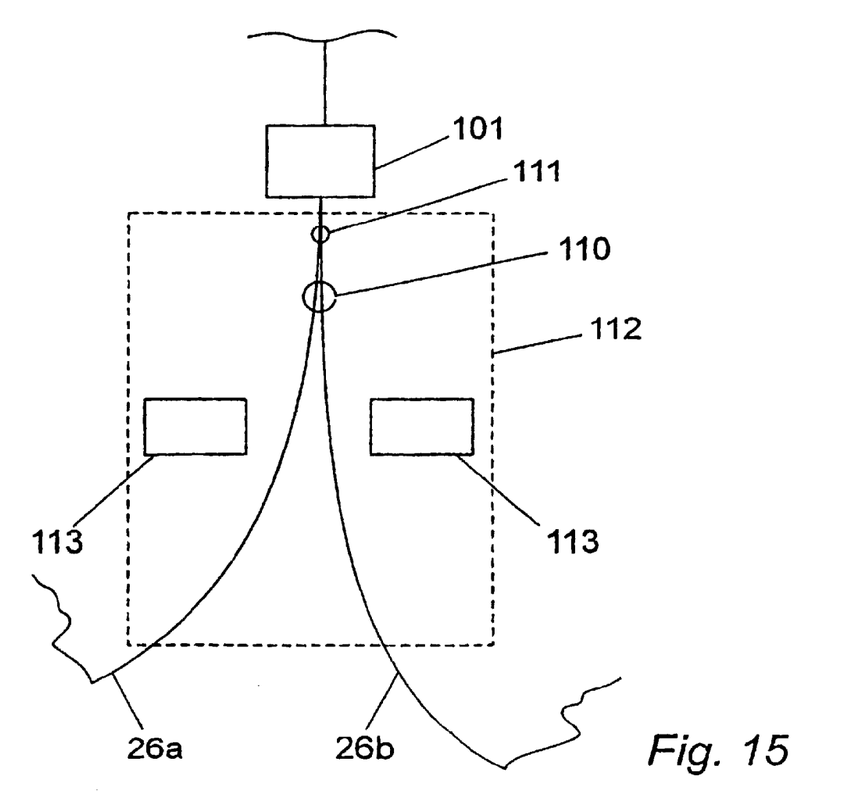
FIG. 15 is a plan view on the fabric support surface of the apparatus of FIG. 14.

FIGS. 14 and 15 show how video detection may be used with the apparatus of the invention to sense the gap between the fabrics to be joined. A video camera 114 has a field of vision 112 on the fabric support surface 91. The information from the video camera is fed to a programmed control unit 115 (DSP or PLC) which adjusts the position and operation of the two steerable drive rollers 113, which each guide one of the pieces of fabric 26a, 26b to be joined. The control unit ensures that the edges of the fabric 26a, 26b pass through the heated area 110 beneath the infra red source 90 and that the edges are the correct distance apart when passing through area 111 beneath the sonotrode 23, at the point of application of the adhesive. The adhesive and fabric is then cooled as it passes beneath the cooling roller 101.

This technology is applicable in the clothing and footwear industries, and has other textile-based applications such as sailmaking, filter production and medical barrier products. Ultrasound-enhanced adhesive bonding may have other applications, on substrates which are difficult to join with conventional adhesives.

Typically the sonotrodes are 7λ/4 long. The vertical glue passages 55 are typically 1 mm in diameter. The radial or transverse passages 56 are typically 2 mm in diameter. The sleeve 62 is of brass. The sonotrode 23, 50 may be made of steel, but more preferably of nickel copper alloy, which is stronger than steel and has better high temperature properties. The transducer may be any suitable transducer, such as Model No UST 640 manufactured by Herfurth.

Glue Tests

The various nozzle arrangements have been tested with adhesives. During these tests the adhesive was seen to foam, and smoke at high ultrasound powers. In the nozzle of FIG. 6 this occurred as soon as the ultrasound was applied, but after prolonged exposure, at high power, it continued once the power was switched off. In the first case it would appear that the adhesive absorbs the ultrasonic energy directly, and the delayed foaming is probably due to heating by the sonotrode. The heating of the sonotrode seems partly due to the rising glue temperature, and partly due to direct ultrasonic heating of the sonotrode, or friction with the o-rings. The rate of o-ring failure was quite high, and the high temperatures attained could have degraded them (Viton is able to withstand temperatures of over 200° C., but the sonotrode was reaching at least 300° C. in places). The foaming appeared to occur inside the sonotrode, without air being drawn up through the aperture. Also, on cooling, many of the bubbles contracted until they were no longer visible. This implies that the vapour forming the foam is a component of the adhesive, or a gas dissolved in it.

The height of the nozzle above the fabric made a difference to the quality of the bead's penetration of the fabric's surface. At a distance of more than 2 mm, the bead cooled too much to penetrate the fabric. At lower distances the end of the sonotrode was slightly submerged in the bead lying on the fabric. This continued to heat the bead and kept it molten.

For this nozzle of FIG. 8, ultrasound seemed to make no difference to the bead until a hot glue foam poured out of the nozzle, which bonded well to the fabric. This was then followed by flow which showed no signs of ultrasonic action. The mechanism for this spasmodic flow could have been gradual heating of the adhesive close to the sonotrode end. The viscosity would have decreased, and once foaming occurred the increased volume could have forced the contents out. This behaviour may imply that the glue need only be super-heated to give a good bond and that the fabric need not be exposed to the ultrasound.

When a monel (copper nickel alloy) sonotrode replaced a steel sonotrode in the arrangement of FIG. 7, the apparatus gave comparable results, but the transducer needed less power. The steel appeared to absorb ultrasonic energy more than the monel. This may have been work-hardening the metal, giving heat as a by-product, and leading to the eventual failure.

The adhesive appears not to transmit ultrasound very well, absorbing most of the energy close to the point of application. This explains why the adhesive foams immediately, when the ultrasound is applied to the nozzle of FIG. 7.

The beads formed by the nozzle of FIG. 7 give superior penetration of the fabric surface when compared to the others. The adhesive is hot when it emerges from the nozzle. Also, the partial emersion of the sonotrode in the adhesive, gives direct coupling between the ultrasound and the adhesive on the fabric. This supplied more heat.

The adhesive used in any suitable hot melt adhesive, supplied in granular or thread form, and may be a stock nylon such as Grilltex (R) Type D1299 made by EMS-American Grilon Inc.

The ultrasonic system of the invention has several advantages over laser-based techniques. Ultrasound is inherently safer than laser radiation, which is especially hazardous to the eye. This is particularly important for a unit which is to be used in any orientation on three-dimensional objects. The laser system also requires adhesive of a controlled opacity, so that it absorbs some energy while transmitting the remainder to the substrate. The ultrasonic system is not influenced by the opacity of the adhesive, so pigments can be added for aesthetic effect, if desired.

These and other modifications and improvements can be incorporated without departing from the scope of the invention.

What is claimed is:

1. Method for producing a bond between edges of members of an article, said method comprising the steps of:
   heating a hot-melt adhesive until it is molten;
   feeding said molten adhesive to an application point in which said adhesive contacts said edges of members;
   applying ultrasound energy by means of a sonotrode to said molten adhesive and said edges of members; and
   allowing said molten adhesive to cool and thereby form a bond between said edges of members; characterized in that said edges of members of an article are aligned in an end to end relationship.

2. Method according to claim 1, whereby mechanical vibrations are induced by the ultrasound energy in said members to aid the formation of the bond.

3. Method according to claim 1, whereby the molten adhesive is fed through a passage in said sonotrode.

4. Method according to claim 1, whereby said members are subject to local heating at the said application point before applying said adhesive.

5. Method according to claim 1, whereby said members are subject to local cooling in the area of the bond after applying said adhesive.

6. Method according to claim 1, wherein said hot melt adhesive is nylon.

7. Article comprises a plurality of members and having a butt bond produced between two of said members by the method according to claim 1.

8. Method for producing a bond between edges of a member or members of an article, said method comprising the steps of:
   aligning two edges of a member or members in an end to end relationship;
   applying both molten adhesive and ultrasonic energy to said aligned edges of a member or members; and
   allowing said molten adhesive to cool and thereby form a bond between said edges of a member or members.

9. Method according to claim 8, wherein said member or members of an article are laminates.

10. Article comprises a plurality of edges of a member or members joined by the method according to claim 8.

11. Method according to claim 2, whereby the molten adhesive is fed through a passage in said sonotrode.

12. Method according to claim 2, whereby said members are subject to local heating at the said application point before applying said adhesive.

13. Method according to claim 3, whereby said members are subject to local heating at the said application point before applying said adhesive.

14. Method according to claim 2, whereby said members are subject to local cooling in the area of the bond after applying said adhesive.

15. Method according to claim 3, whereby said members are subject to local cooling in the area of the bond after applying said adhesive.

16. Method according to claim 4, whereby said members are subject to local cooling in the area of the bond after applying said adhesive.

17. Method according to claim 2, wherein said hot melt adhesive is nylon.

18. Method according to claim 3, wherein said hot melt adhesive is nylon.

19. Method according to claim 4, wherein said hot melt adhesive is nylon.

20. Method according to claim 5, wherein said hot melt adhesive is nylon.

21. Article comprises a plurality of members and having a butt bond produced between two of said members by the method according to claim 3.

22. Article comprises a plurality of members and having a butt bond produced between two of said members by the method according to claim 3.

23. Article comprises a plurality of members and having a butt bond produced between two of said members by the method according to claim 4.

24. Article comprises a plurality of members and having a butt bond produced between two of said members by the method according to claim 5.

25. Article comprises a plurality of members and having a butt bond produced between two of said members by the method according to claim 6.

26. Article comprises a plurality of members and having a butt bond produced between two of said members by the method according to claim 9.

\* \* \* \* \*